(12) United States Patent
Yamaguchi et al.

(10) Patent No.: US 8,558,100 B2
(45) Date of Patent: Oct. 15, 2013

(54) MUSIC PRODUCTION APPARATUS AND METHOD OF PRODUCING MUSIC BY COMBINING PLURAL MUSIC ELEMENTS

(75) Inventors: Shinpei Yamaguchi, Tokyo (JP); Isamu Terasaka, Tokyo (JP); Junko Sano, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1150 days.

(21) Appl. No.: 12/488,671

(22) Filed: Jun. 22, 2009

(65) Prior Publication Data

US 2009/0318225 A1  Dec. 24, 2009

(30) Foreign Application Priority Data

Jun. 24, 2008 (JP) ................................. 2008-165142
Jun. 24, 2008 (JP) ................................. 2008-165143

(51) Int. Cl.
*G10H 1/36* (2006.01)
*G10H 7/00* (2006.01)

(52) U.S. Cl.
USPC ............................................................ 84/634

(58) Field of Classification Search
USPC ................................................... 84/609, 634
See application file for complete search history.

(56) References Cited

U.S. PATENT DOCUMENTS

| | | | | |
|---|---|---|---|---|
| 5,627,335 A | * | 5/1997 | Rigopulos et al. | 84/635 |
| 2009/0088877 A1 | * | 4/2009 | Terauchi et al. | 700/94 |

FOREIGN PATENT DOCUMENTS

| | | |
|---|---|---|
| JP | 11-288285 | 10/1999 |
| JP | 2001-188537 | 7/2001 |
| JP | 2002-258842 | 9/2002 |
| JP | 2004-109285 | 4/2004 |
| JP | 2004-171019 | 6/2004 |
| JP | 2006-84749 | 3/2006 |
| JP | 2006/251053 | 9/2006 |

OTHER PUBLICATIONS

Notification of Reason(s) for Refusal dated May 18, 2010, from the corresponding Japanese Application.

* cited by examiner

*Primary Examiner* — Jeffrey Donels
(74) *Attorney, Agent, or Firm* — Katten Muchin Rosenman LLP

(57) ABSTRACT

A music production apparatus includes a melody data storage operative to store music data for a plurality of melody elements forming music, a condition storage operative to store a condition for combining melody elements and a condition related to an attribute applicable when playing the melody element, an element selector operative to determine, at a predetermined point of time, whether a melody element should be allocated to a track where no melody elements are allocated, and to select, when it is determined that a melody element should be allocated to the track, a melody element that should be allocated to the track by referring to the condition for combining melody elements stored in the condition storage, an attribute determination unit operative to determine an attribute applicable when playing the selected melody element, and a sound production unit operative to read music data for the selected melody element from the melody data storage, to apply the attribute determined by the attribute determination unit, and to produce a sound signal that should be output to a speaker, using the music data for the melody element allocated to the track.

12 Claims, 14 Drawing Sheets

FIG.3

| 70 | 71 | 72 | 73 | 74 | 75 | 76 | 77 | 78 | 79 |
|---|---|---|---|---|---|---|---|---|---|
| TRACK | FILE NAME | OCCURRENCE RATE | RESTRICTIVE RULE | VOLUME | PAN ANGLE | PANNING MODE | PAN DISTANCE | RELATIVE PAN ANGLE | REVERB |
| 1A | 1 | 1A1 | 100 | — | 100 | 0(FIXED) | — | — | 100 | — |
| CONDITION FOR TRANSITION | | TRANSITION TO 2A WHEN 1A IS PLAYED ONCE | | | | | | | |
| 2A | 1 | 1A1 | 20 | — | 100 | 0(FIXED) | — | — | 100 | — |
| | 1 | 2A11 | 30 | | 40~100 | -30~+30 | — | — | 100 | — |
| | 1 | 2A12 | 20 | | 60~100 | -30~+30 | — | — | 50 | — |
| | 2 | 2A21 | 30 | | 70~100 | -359~+359 | — | — | 100 | — |
| | 2 | 2A22 | 20 | | 40~100 | -359~+359 | A | +360 | 75 | — |
| | 3 | 2A3 | 30 | | 40~100 | -359~+359 | A | -360 | 75 | — |
| | 4 | 2A4 | 30 | | 40~100 | -30~+30 | D | +360 | 100 | — |
| CONDITION FOR TRANSITION | | TRANSITION TO B WHEN 2A IS PLAYED TWO MINUTES | | | | | | | |
| B | 1 | B1 | 50 | PLAYED ON STRONG BEAT | 100 | 0(FIXED) | — | — | 100 | — |
| | 2 | B2 | 40 | PLAYED IN EVEN-NUMBERED MEASURES | 40~100 | -359~+359 | A | -360 | 75 | — |
| | 3 | B3 | 40 | PLAYED IN ODD-NUMBERED MEASURES | 40~100 | -30~+30 | D | +360 | 100 | — |
| CONDITION FOR TRANSITION | | RETURN TO 1A OR 2A AND LOOP WHEN B IS PLAYED TWO MINUTES | | | | | | | |

MUSIC PRODUCTION APPARATUS AND METHOD OF PRODUCING MUSIC BY COMBINING PLURAL MUSIC ELEMENTS

BACKGROUND OF THE INVENTION

1. Field of the Invention

The present invention relates to a sound production technology and, more particularly, to a music production apparatus, a music production method, and a program.

2. Description of the Related Art

Background music for games is produced by repeatedly playing a single music piece or switching multiple melodies of the same length and repeatedly playing the melodies.
[patent document No. 1] JP 2002-258842

However, users playing a game for a long period of time may feel bored as the same background music is played many times over. In order to prevent users from feeling bored, a technology is called for capable of producing different music each time a user plays the game.

SUMMARY OF THE INVENTION

The present invention addresses the needs and a purpose thereof is to provide a music production technology capable of providing highly entertaining music.

An aspect of the present invention relates to a music production apparatus. The music production apparatus comprises: a melody data storage operative to store music data for a plurality of melody elements forming music; a condition storage operative to store a condition for combining melody elements stored in the melody data storage and a condition related to an attribute applicable when playing the melody element; an element selector operative to determine, at a predetermined point of time, whether a melody element should be allocated to a track where no melody elements are allocated, and to select, when it is determined that a melody element should be allocated to the track, which is among a plurality of tracks, a melody element that should be allocated to the track by referring to the condition for combining melody elements stored in the condition storage; an attribute determination unit operative to determine an attribute applicable when playing the selected melody element, by referring to the condition storage; and a sound production unit operative to read music data for the selected melody element from the melody data storage, to apply the attribute determined by the attribute determination unit, and to produce a sound signal that should be output to a speaker, using the music data for the melody element allocated to the track.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows an example of internal data in the condition storage;

DETAILED DESCRIPTION OF THE INVENTION

The invention will now be described by reference to the preferred embodiments. This does not intend to limit the scope of the present invention, but to exemplify the invention.

First Embodiment

In the first embodiment, we propose a technology whereby a plurality of melody elements that make music are prepared and a virtually infinite variety of music is produced by combining the elements as desired. The first embodiment provides a technology for producing colorful, innovative, and deep music not only by combining melody elements as desired but also by adjusting attributes such as timing for reproduction, volume, reverb, and pan of each melody element as desired and by combining the resultant elements.

Figure 1:
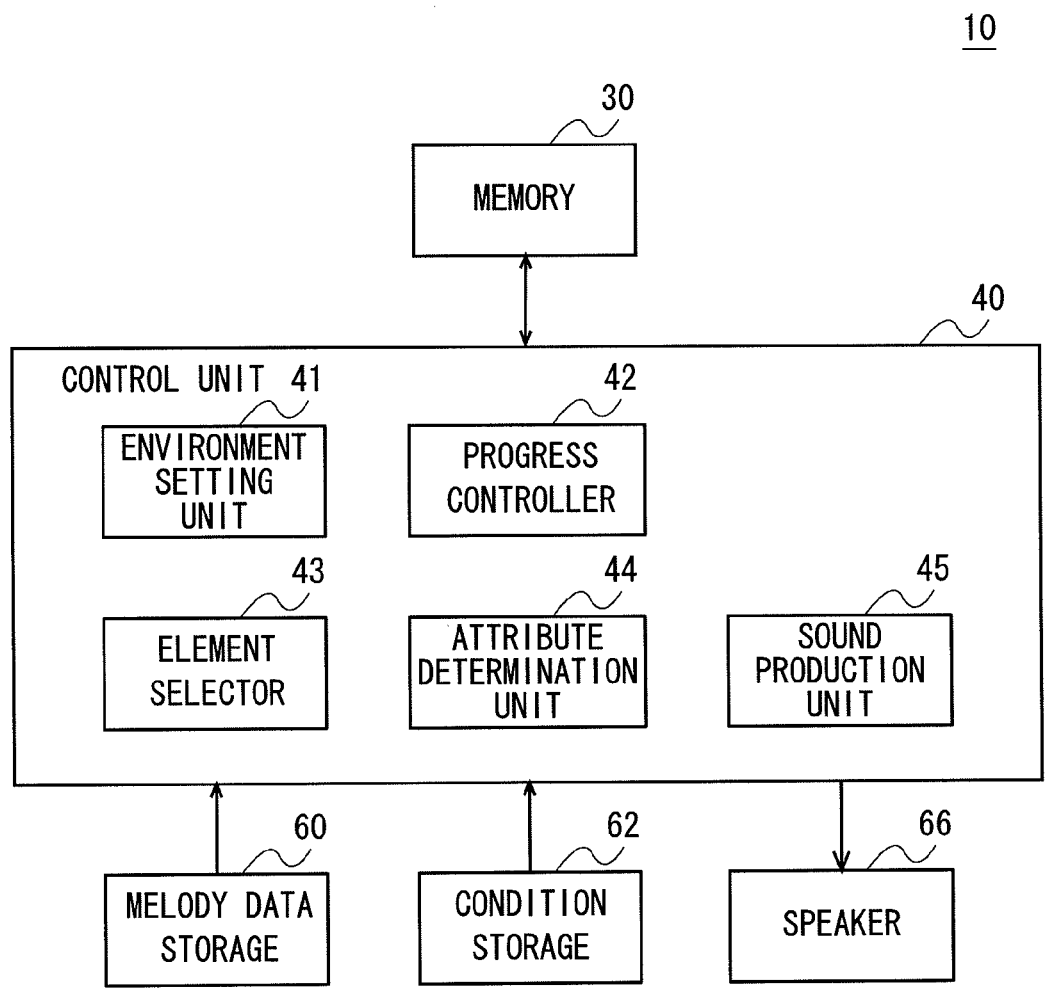
FIG. 1 shows the structure of the music production apparatus according to an embodiment.

FIG. 1 shows the structure of a music production apparatus 10 according to this embodiment. The music production apparatus 10 comprises a memory 30, a control unit 40, a melody data storage 60, a condition storage 62, and a speaker 66. These components are implemented in hardware by a CPU, memory, or a program loaded into the memory of an arbitrary computer. The illustration depicts functional blocks implemented by the coordination of the components. Therefore, it will be obvious to those skilled in the art that the functional blocks may be implemented in a variety of manners by hardware only, software only, or a combination of thereof.

Figure 2:
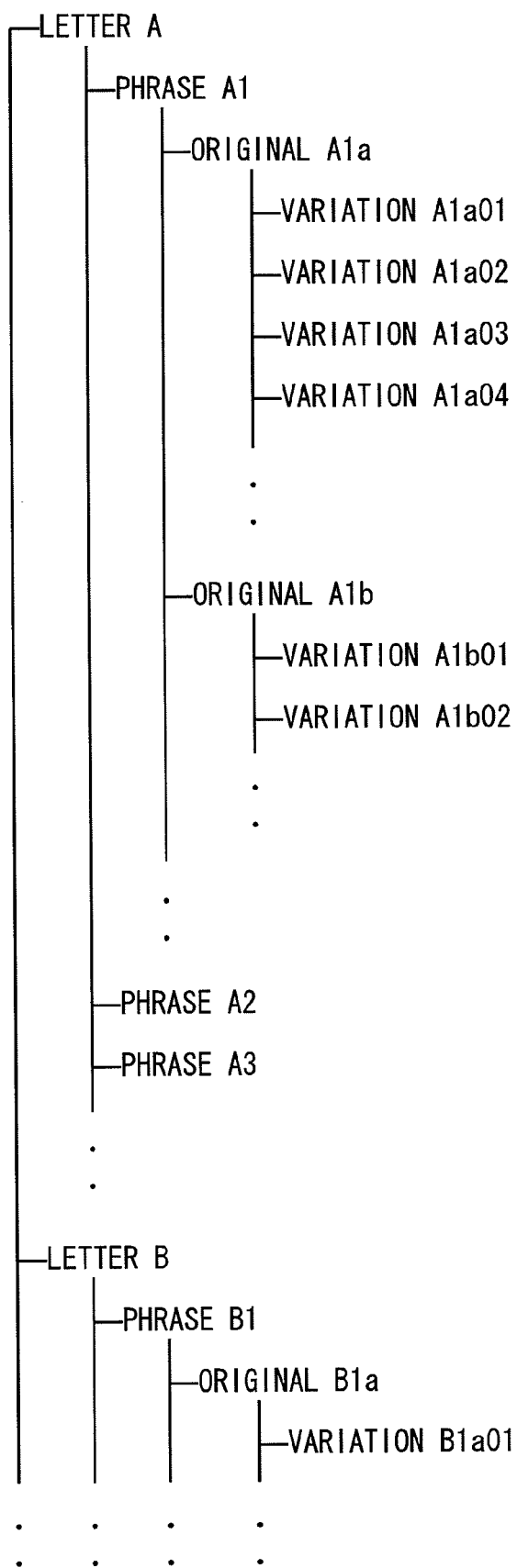
FIG. 2 shows an example of internal data in the melody data storage.

The melody data storage 60 stores music data for melody elements. FIG. 2 shows an example of internal data in the melody data storage 60. The melody data storage 60 stores music data for the melody elements categorized according to the letter, phrase, or tone. Basically, a letter is provided for each block of music, a phrase is provided for each track. However, melody elements belonging to different letters may be allocated to the same block, or melody elements belonging to the same phrase may be allocated to different tracks. A plurality of variations belonging to "original A1a" contain the same tones that make the melody element and are produced by arrangements that change the rhythm, octave, etc. Accordingly, the plurality of variations belonging to "original A1a" belong to the same tone group. The music production apparatus 10 produces music by combining music data for these melody elements.

The condition storage 62 stores conditions for combining melody elements and conditions related to attributes applicable when reproducing the melody element. FIG. 3 shows an example of internal data in the condition storage 62. The conditions related to melody elements stored in the condition storage 62 are defined for each block of music produced. For example, block "1A" comprises only melody elements from a file "1A1". In block "2A", one of files "1A1", "2A11", and "2A12" is allocated to track "1", "2A21" or "2A22" is allocated to track "2", "2A3" is allocated to track "3", and "2A4" is allocated to track "4". The condition storage 62 stores conditions for transition between blocks. For example, when the melody element from the file "1A1" is played once in block "1A", control makes a transition to "2A". When music for block "2A" is played for two minutes, control makes a transition to "B". When music for "B" is played for two minutes, control is returned to "1A" or "2A". A progress controller 42 controls the progress of music by referring to these conditions. The condition storage 62 also stores exclusion conditions associated with melody elements. For example, a condition may define that a melody element belonging to a given phrase is not played concurrently with a melody element belonging to a specified phrase. The exclusion condition is referred to when an element selector 43 selects a melody element so that the condition is applied accordingly.

The condition storage 62 is provided with a track field 70, a file name field 71, an occurrence rate field 72, a restrictive rule field 72, a volume field 74, a pan angle field 75, a panning mode field 76, a pan distance field 77, a relative pan angle field 78, and a reverb field 79. The ID of a track assigned a melody element is entered in the track field 70. In this embodiment, eight tracks are provided so that a maximum of eight melody elements can be played concurrently. The file name of music data for a melody element is entered in the file name field 71. The occurrence rate of allocation of a melody element is entered in the occurrence rate field 72. The higher the occurrence rate, the more frequently the associated melody element is allocated. The rule governing whether the melody element may be selected is entered in the restrictive rule field 73. For example, rules like "played in odd-numbered measures", "played in even-numbered measures", "played on the second beat", "played on the strong beat", "not played concurrently with another specific melody element" may be stored. The element selector 43 selects a melody element allocated to a track by referring to these conditions.

The range of volume of a melody element played is entered in the volume field 74. The range of angles of panning the sound source location for the channels included in music data for the melody element is entered in the pan angle field 75. The mode for panning the sound source location is entered in the panning mode field 76. The distance or the range of distance of panning the sound source location is entered in the pan distance field 77. The relative angle or the range of relative angles between sound source locations when sound source locations for a plurality of channels are panned is stored in the relative pan angle field 78. The level of reverb or the range of levels of reverb is entered in the reverb field 79. These attributes are determined by an attribute determination unit 44.

The environment setting unit 41 reads information related to music that should be played from the condition storage 62 into the memory 30. The environment setting unit 41 refers to the information read from the condition storage 62 and acquires the data size of all melody elements that make music. The unit 41 sorts the melody elements according to the data size and reads music data for the music element having a predetermined data size into the memory 30 in the ascending order of data size, allowing the data thus read to remain resident in the memory 30. When the data size for the melody element is not stored in the condition storage 62, the data size may be acquired from the file system of the melody data storage 60. Alternatively, music data for the melody element may actually be read from the melody data storage 60.

The melody element resident in the memory 30 will be referred to as "on-memory stream". The other melody elements are read into the memory 30 from the melody data storage 60, when needed. The melody elements not resident on the memory 30 will be referred to as "file stream". The melody 30 may be implemented by a memory device capable of high-speed reading and writing. Generally, however, such a memory device has a small capacity and is expensive. Meanwhile, the melody data storage 60 may be implemented by a large-capacity storage device such as a hard disk and an optical disk. Accordingly, the memory 30 is efficiently used and the speed of processing is increased, by ensuring that music data for the melody element having a predetermined size remains resident in the memory 30.

The progress controller 42 refers to the condition for transition between blocks of music read from the condition storage 62 into the memory 30 and controls the progress of music accordingly. When the music is started to be played, the progress controller 42 directs the element selector 42 to apply the condition for the first block. When the condition for transition from the first block to the next block is met, the progress controller 42 directs the element selector 42 to apply the condition for the next block. When the melody element selected in the first block has not completely been played, the transition to the next block may occur when the melody element has completely been played. Alternatively, the transition to the next block may occur by discontinuing the playback of the melody element. Still alternatively, the transition to the next block may occur while continuing the playback of the melody element. One of the stated conditions for transition may be stored in the condition storage 62. The progress controller 42 may initiate a transition to a different block or different music when another system or device requests the transition. For example, the occurrence of an event in a game controlled by a game device not shown may initiate the playback of music assigned to the event. By ensuring that the progress of music is controllable according to the condition for transition between blocks, the length of music can be adjusted as desired.

Given a plurality of tracks, the element selector 43 determines, at a predetermined point of time, whether to allocate a melody element that should be allocated to a track where no melody elements are allocated. If the selector 43 determines that a melody element should be allocated to a track, which is one of a plurality of tracks, the selector 43 selects a melody element allocated to the track, by referring to the condition, stored in the condition storage 62, for combining melody elements. The element selector 43 may determine whether a melody element should be allocated to a track at predetermined time intervals (e.g., at every beat). Alternatively, the selector 43 may make a determination when a track is made available for allocation of a melody element or a predetermined period of time before a track is made available for allocation.

The element selector 43 first refers to the condition stored in the memory 30 so as to determine whether there are any melody elements allocatable to a track available for allocation. For example, referring to FIG. 3, while block "1A" is being played, there are no tracks other than "1" where melody elements are allocatable. Therefore, the element selector 43 does not allocate new melody elements to tracks until block "1A" has been played. If there are melody elements allocatable to an available track, the melody element selector 43 then collects information indicating the available capacity of the memory 30 or use status of a processor (e.g., a CPU) that implements the function of the control unit 40. The selector 43 determines whether to allocate a melody element to a track by referring to the information thus collected. More specifically, the melody element selector 43 does not allocate a melody element to a track when the available capacity of the memory 30 falls below a predetermined value or when the use factor indicating the load on the processor exceeds a predetermined value. With this, suspension or delay of playback of music due to the excess load on the processor or overflow of the memory 30 can be prevented. The predetermined value used for determination may be predefined according to the performance of the processor or the total capacity of the memory 30. Alternatively, the value may be determined according to the data size of the melody element or the structure of music being played.

When the element selector 43 determines that a melody element should be allocated to a track, the selector 42 extracts a melody element that can be allocated to the track, by referring to the condition maintained in the memory 30. For example, in allocating a melody element to track "1" while "2A" is being played, "1A1", "2A11", and "2A12" are extracted as allocatable melody elements. The element selector 43 removes those melody elements designated in the restrictive rule as being excluded from the allocation from the melody elements thus extracted. When a plurality of melody elements are still selectable, the element selector 43 selects melody elements according to the occurrence rate. For example, the element selector 43 generates a random number n between 0 and 1. If $0 \leq n<0.2$, the selector 43 selects "1A1". If $0.2 \leq n<0.5$, the selector 43 selects "2A11". If $0.5 \leq n<0.7$, the selector 43 selects "2A12".

The element selector 43 verifies whether the selected melody element is resident on the memory 30 as an on-memory stream or stored in the melody data storage 60 as a file stream. If the element is identified as a file stream, the selector 43 determines whether the music data for the melody element can be read from the melody data storage 60 and to produce a sound signal accordingly before it is time to play the melody element. When the selector 43 determines that it is impossible, the selector 43 deselects the melody element. The relation between the data size of music data for a melody element and the time required to process the music data and produce a sound signal accordingly may be computed in advance and stored in the condition storage 62, mapping the relation to parameters like the processor performance or the total capacity of the memory 30, so that the relation may be used for determination.

The attribute determination unit 44 determines an attribute applicable when the melody element allocated to a track is played. The attribute determination unit 44 randomly determines a parameter value defining the attribute within the range defined for the condition read by the condition storage 62 into the memory 30. For example, for reproduction in "1A", "1A1" allocated to track "1" is played such that the volume is set to "100", the pan angle is "fixed", and the relative pan angle is set to "100°". For reproduction in "2A", "2A3" allocated to track "3" is played such that the volume is set to a randomly determined value in the range "40-100", the pan angle is set to a randomly determined value in the range "−359-+359, the panning mode is set to "A", the pan distance is set to "−360", and the relative pan angle is set to "75°". The attribute determination unit 44 further determines the timing for starting the playback of melody element by referring to the condition stored in the memory 30. For example, if a restrictive rule governing the melody element defines "played on the strong beat", the playback of the melody element is set to start on the strong beat.

A sound production unit 45 reads the music data for the selected melody element from the memory 30, if the melody element is an on-memory stream or reads the data from the melody data storage 60, if the element is a file stream. The unit 45 applies the attribute determined by the attribute determination unit 44 so as to produce a sound signal that should be output to the speaker 66, using the music data for the melody elements allocated to the respective tracks. If the music data comprises a plurality of channels, the sound signal production unit 45 produces a sound signal that should be output to each of a plurality of speakers 66 by applying sound data for the respective channels to sound source locations determined by the attribute determination unit 44. For example, when a stereo speaker is provided, the unit 45 produces a stereo sound signal and outputs the signal to the speaker 66. When speakers compatible with 5.1-channel surround sound is provided, the unit 45 produces and outputs signals that should be output to the speakers 66.

Figure 4:
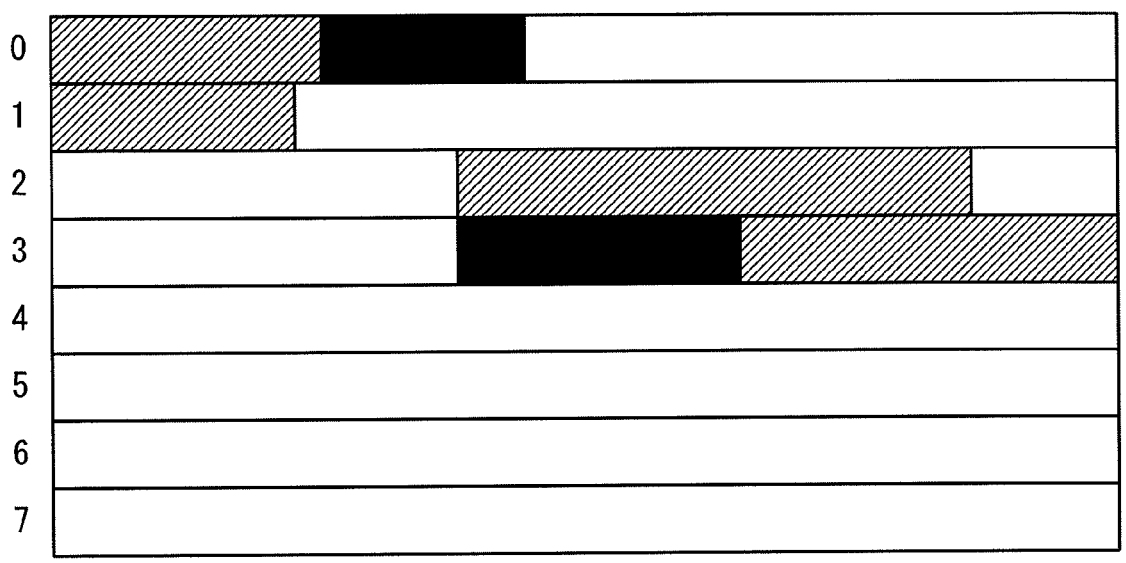
FIG. 4 shows how melody elements are allocated to tracks.

FIG. 4 shows how melody elements are allocated to tracks. Referring to FIG. 4, shaded rectangles indicating melody elements allocated to the respective tracks are shifted toward left as time elapses. When the element reaches the left end, the associated melody element is started to be played. For example, the melody elements allocated to tracks 0 and 1 re being played. Tracks 3 and 4 have melody elements allocated thereto but the playback is not started yet. Solid rectangles indicate silence. Thus, in addition to allocating melody elements, silence may be explicitly created. According to this embodiment, the sound production unit 45 is capable of processing the production of sound for a total of 128 channels concurrently. Once the melody elements are allocated to the respective tracks, the unit 45 makes available as many channels as are included in the music data for the melody elements and produces sound in time for the start of playback in the respective channels.

Figure 5:
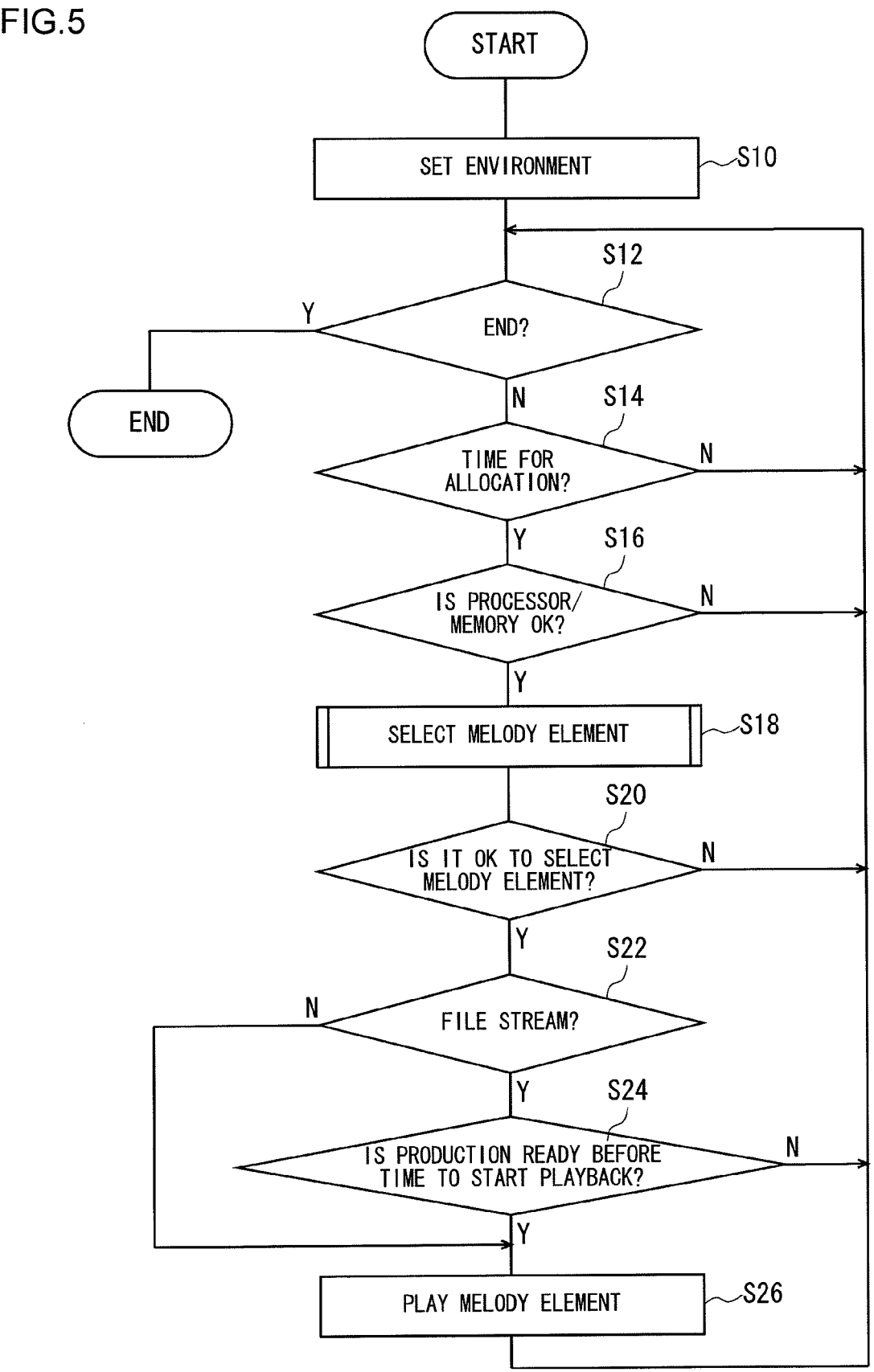
FIG. 5 is a flowchart showing the steps for producing sound according to the embodiment.

FIG. 5 is a flowchart showing the steps for producing sound according to this embodiment. The environment setting unit 41 reads the condition stored in the condition storage 62, makes a part of the music data for the melody element stored in the melody data storage 60 resident in the memory 30, thereby setting the environment for producing music (S10). The steps for producing music are repeated until the progress controller 42 terminates the playback of music (N in S12). The element selector 43 stands by until it is time to allocate melody elements to tracks (N in S14). When it is time (Y in S14), the unit 43 verifies the use status of the processor and the available capacity of the memory 30 so as to determine whether the process will be successful when a new melody element is allocated (S16). When it is determined that the process will not be successful (N in S16), control is returned to S12. When it is determined that the process will be successful (Y in S16), the unit 43 refers to the condition stored in the memory 30 and selects a melody element that can be allocated to an available track (S18). A detailed description of S18 will be given later with reference to FIG. 16. If no melody elements are selected (N in S20), control is returned to S12.

When a melody element is selected (Y in S20), the element selector 43 verifies whether the selected melody element is a file stream or an on-memory stream (S22). If the element is a file stream (Y in S22), the unit 43 verifies whether the process of producing a sound signal from the sound data for the melody element will be completed before it is time to play the melody element (S24). If the process cannot be completed (N in S24), control is returned to S12 without playing the melody element. If the process can be completed (Y in S24), the attribute determination unit 44 determines an attribute applicable when playing the melody element, according to the condition stored in the memory 30. The sound production unit 45 plays the melody element by applying the attribute thus determined (S26). If the selected melody element is determined in S22 to be an on-memory stream (N in S22), it means that the sound signal can be produced before it is time to start the playback so that S24 is skipped and the unit 45 starts playing the melody element (S26). When the melody element has been played, control is returned to S12. When the progress controller 42 completes the playback of music (Y in S12), the process for producing music is terminated.

Figure 6:
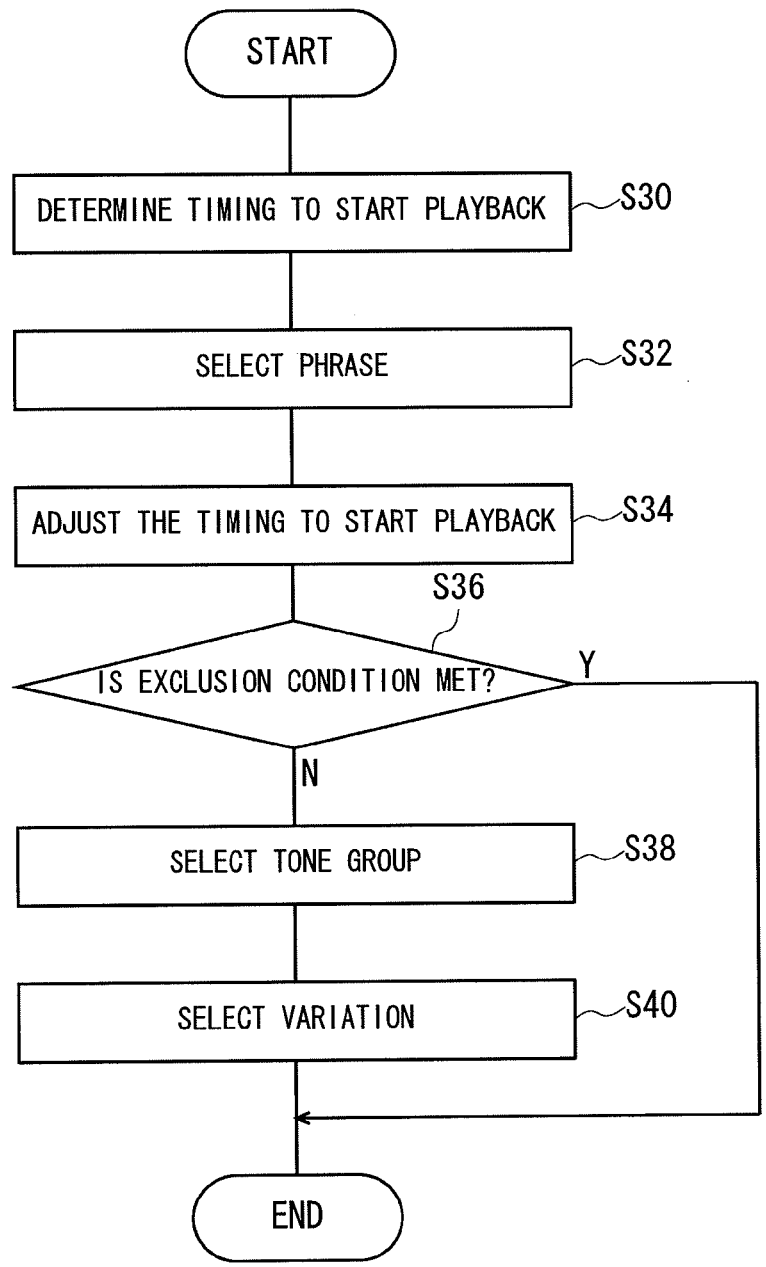
FIG. 6 is a flowchart showing the steps for producing sound according to the embodiment.

FIG. 6 is a flowchart showing those of the music generation steps that are performed to select a melody element. The element selector 43 determines the timing to start playing a melody element (S30). When the music being played is tempo-free music, the element selector 43 randomly determines the timing to start the playback. When the tempo of the music being played is defined, the element selector 43 determines the timing to start the playback by referring to the tempo of the music being played on the condition that the melody element is properly allocated. For example, the playback may start on the strong beat. Alternatively, the playback may start on the first strong beat in a measure.

Subsequently, the element selector 43 selects the phrase of the melody element allocated to the track (S32). The element selector 43 selects the phrase of the melody element allocated to the track from a plurality of phrases belonging to the same letter, by referring to the occurrence rate designated in the condition stored in the condition storage 62. The element selector 43 then adjusts the timing of starting the playback of the melody element (S34). The element selector 43 refers to the restrictive condition binding the melody element belonging to the selected phrase and further varies the music by advancing or delaying the timing to start the playback in a range permitted by the condition. When the music being played is tempo-free, the element selector 43 randomly adjusts the timing to start the playback in a permitted range. When the tempo of the music being played is defined, the element selector 43 randomly adjusts the timing to start the playback within the permitted range, in units of beats, half beats, or measures.

The element selector 43 then verifies whether the selected phrase meets the exclusion condition stored in the condition storage 62 (S36). If the exclusion condition is met (Y in S36), the unit 43 does not select the melody element and terminates the process. If the exclusion condition is not met (N in S36), the element selector 43 randomly selects a tone group from a plurality of tone groups belonging to the selected phrase (S38). The element selector 43 randomly selects a variation from a plurality of variations included in the selected tone group (S40). In this way, melody elements allocated to tracks are selected.

As described, according to this embodiment, a variety of music can be produced by combining various melody elements as desired and arbitrarily adjusting attributes applicable to the melody elements.

Second Embodiment

Field of the Second Embodiment

This embodiment relates to a game control technology and, more particularly, to a game device, game control method, and game control program for controlling sound in a three-dimensional space where a plurality of objects are located.

Description of the Related Art of the Second Embodiment

Games that simulate a virtual three-dimensional space are now available. In such a game, viewing positions and viewing directions are set up in a virtual three-dimensional space. The image of the virtual three-dimensional space as viewed from the viewing point position thus set up in the viewing direction is displayed. Further, sound in the virtual three-dimensional space as heard at the viewing positions thus set up is output.
[patent document No. 1] JP 2002-258842

If the number of objects set up in the virtual three-dimensional space is relatively small, shape data of individual objects may be rendered to produce images and acoustic fields may be simulated using sound data for individual objects so as to produce sound. However, as the number of objects located in the virtual three-dimensional space grows, the load from necessary computation also grows dramatically. A technology is called for capable of reproducing realistic sound and increasing gaming pleasure, while preventing the computational load from increasing.

Summary of the Second Embodiment

The present invention addresses the needs and a purpose thereof is to provide a game control technology capable of providing highly enjoyable games.

An aspect of the present invention relates to a program product. The program product is adapted for playback of music by combining music data for a plurality of melody elements stored in a melody data storage. The product comprises: a module that determines, at a predetermined point of time, whether a melody element should be allocated to a track where no melody elements are allocated; a module that selects, when it is determined that a melody element should be allocated to the track, which is among a plurality of tracks, a melody element that should be allocated to the track by referring to the condition for combining melody elements stored in the condition storage, which stores the condition for combining melody elements and a condition related to an attribute applicable when playing the melody element; a module that determines an attribute applicable when playing the selected melody element, by referring to the condition storage; and a module that reads music data for the selected melody element from the melody data storage, applies the attribute determined by the module for determining an attribute, and producing a sound signal that should be output to a speaker, using the music data for the melody element allocated to the track.

Detailed Description of the Second Embodiment

The game device according to the second embodiment locates a plurality of objects in a virtual three-dimensional space built in the game device and provides the image and sound to the user. For example, the game device creates the undersea world, which is hard to experience, by simulating a school of fish swimming in the sea. The user can navigate through the virtual three-dimensional space as desired by controlling the viewing position and viewing direction. This gives the user simulated experience of freely swimming in the sea where the school of fish swims.

If the number of objects located in the virtual three-dimensional space is relatively small, the sound produced by each object may be simulated, defining the position of the object as an acoustic field, so that the three-dimensional acoustic field is computed and the sound of the game world is produced. However, the computational load will be enormous if, for example, a school of fish is simulated such that the sound produced by thousands or tens of thousands of fish is individually simulated. This embodiment is adapted to a large number of objects located in a virtual three-dimensional space and provides a technology for creating highly realistic sound without increasing the load.

Figure 7:
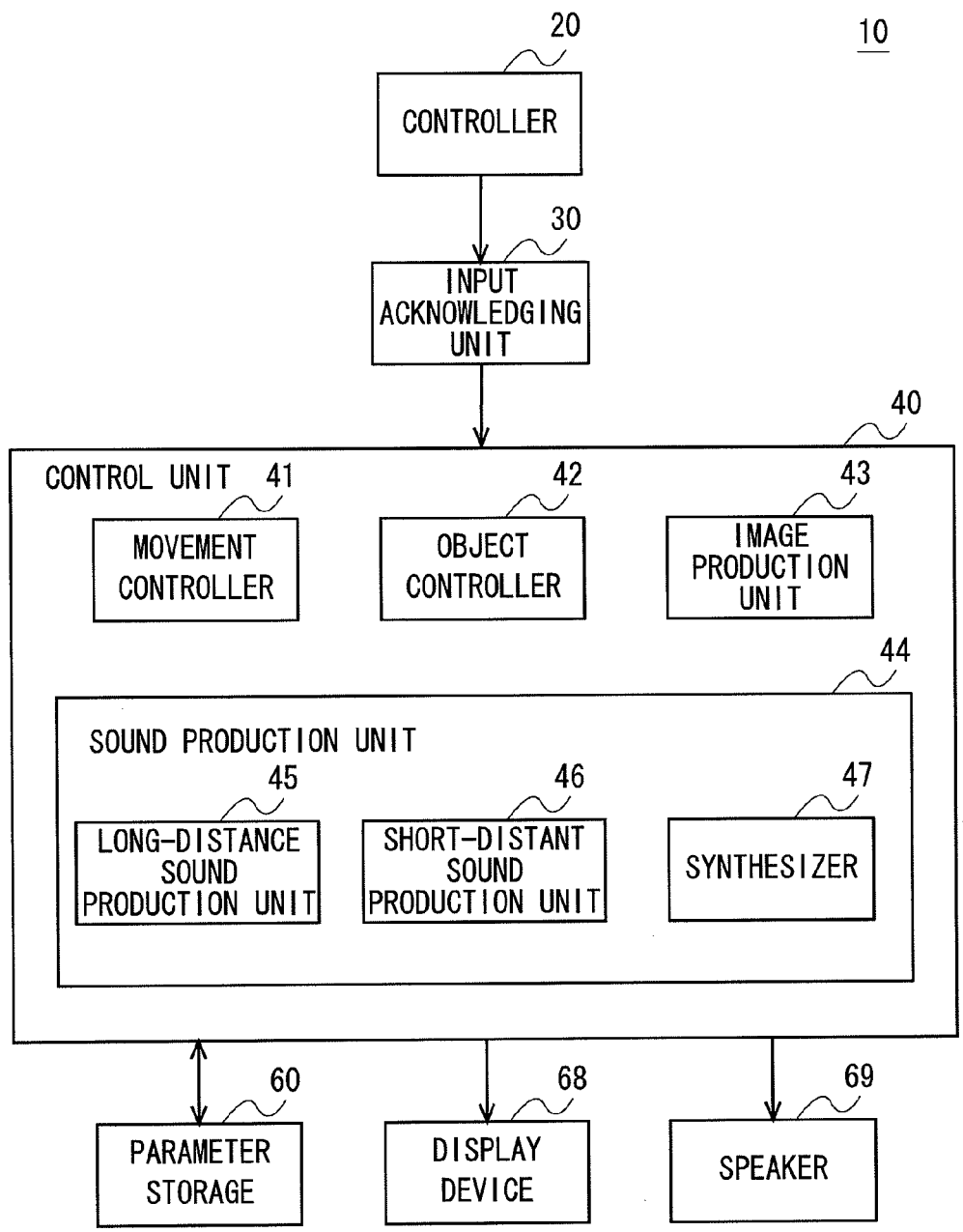
FIG. 7 shows the structure of the game device according to the embodiment.

FIG. 7 shows the structure of a game device 110 according to this embodiment. The game device 110 comprises a controller 120, an input acknowledging unit 130, a control unit 140, a parameter storage 160, a display device 168, and a speaker 169. The configuration is implemented, in hardware components, by any CPU of a computer, a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination of thereof.

The input acknowledging unit 130 acknowledges a control signal fed from the controller 120 controlled by the user. The control unit 140 simulates images and sounds of the virtual three-dimensional space and produce images and sounds of the game, changing the viewing position or viewing direction by referring to the control input provided by the user and acknowledged by the input acknowledging unit 130. The parameter storage 160 stores data for the virtual three-dimensional space built in the game space or data for objects located in the virtual three-dimensional space. The display device 168 displays the game screen produced by the control unit 140. The speaker 169 outputs the sound of the game produced by the control unit 140.

Figure 8:
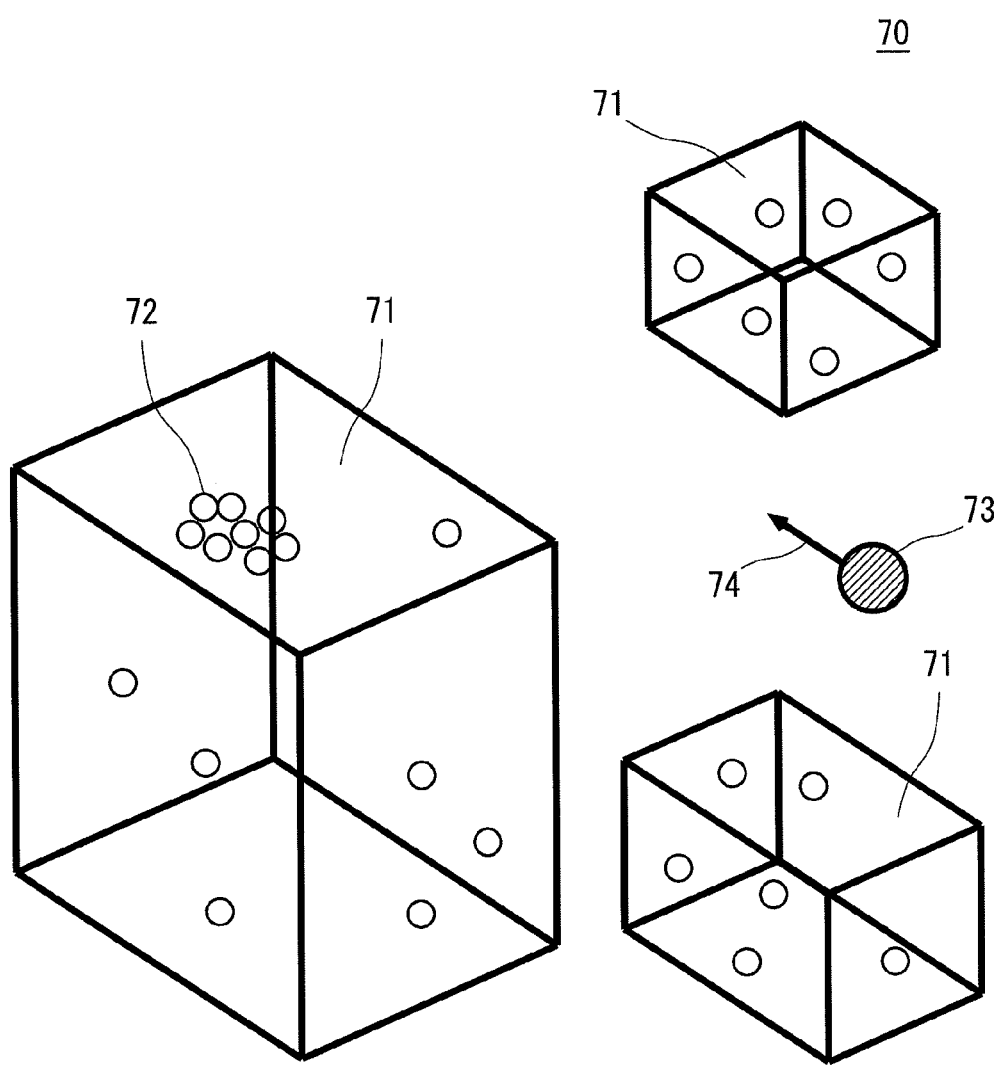
FIG. 8 shows an exemplary virtual three-dimensional space built in the game device.

FIG. 8 shows an exemplary virtual three-dimensional space built in the game device. A plurality of subspaces 171 are provided in a virtual three-dimensional space 170. The object 172 is located in the subspace 171 and the movement of the object 172 is confined to the subspace 171. In the virtual three-dimensional space 170 are set up a viewing position 173 and a viewing direction 174, which are defined to produce the image and sound in the game space. The viewing position 173 and viewing direction 174 are controlled by a movement controller 141. The parameter storage 160 stores data necessary to produce images and sounds for the game. For example, the storage 160 may store shape data indicating, for example, the central coordinates, width, depth, and height of the subspace 170, data on the coordinates and shape of the object 172, the coordinates of the viewing position 173, the vector components of the viewing direction 174, the sound data for a group of objects located in the subspace 171, or the like.

The movement controller 141 changes the viewing position or viewing direction according to the control input from the controller 120. Upon changing the viewing position or viewing direction, the movement controller 141 stores in the parameter storage 160 data such as the coordinates of viewing position, the vector components indicating the viewing direction, etc.

An object controller 142 controls the movement of objects located in the virtual three-dimensional space. For each object type, the object controller 142 sets up a subspace indicating a range where object is located. The controller 42 allows the object to move in the subspace thus set up. The object controller 142 may individually control the movement of objects. Alternatively, objects may be organized into groups that are controlled by the controller 142. For example, when simulating schools of fish in the sea, the object controller 142 sets up subspaces for different types of fish such as tuna, sardine, and mackerel, defining the ranges where the fish can swim. The controller 142 let the fish swim in the subspaces. For example, the object controller 142 may determine the direction and speed of movement of the fish leading the school by generating random numbers so as to let the fish move accordingly. The controller 142 may control the other fish belonging to the school to follow the fish swimming ahead. The fish may be controlled to break away from the school when predator fish approach. The object controller 142 computes the coordinates of objects subsequent to the movement and, if the coordinates are defined in the subspace, the unit 142 stores the coordinates in the parameter storage 160. If the coordinates are outside the subspace, the controller 142 calibrates the coordinates to fit the nearby subspace before storing them in the parameter storage 160. The object controller 142 may shift the subspace or modify the form of subspace.

An image production unit 143 reads the viewing position and viewing direction that are currently set up from the parameter storage 160. The unit 143 retrieves, from the parameter storage 160, an object located within a predetermined angle of view when it is viewed from the viewing position and in the viewing direction thus read. The unit 143 reads the coordinates and shape data for the object thus retrieved. The image production unit 143 renders the object thus read so as to produce an image of the virtual three-dimensional space as viewed from the viewing position and in the viewing direction.

A sound production unit 144 reads the viewing position and viewing direction currently set up from the parameter storage 160. The unit 144 produces the sound in the virtual three-dimensional space as heard at the viewing position. As mentioned before, this embodiment does not simulate the entirety of sound produced by the individual objects but simulate the sound in units of object groups located in the subspaces. When the distance between the viewing position and the subspace is great, a long distance sound production unit 145 simulates the sound from the object group located in the subspace. When the distance between the viewing position and the subspace is small, a short distance sound production unit 146 simulates the sound from the object group located in the subspace.

The parameter storage 160 stores sound data for long distance and sound data for short distance for each object group, depending on the distance between the viewing position and the subspace. The long distance sound data is created as 2-channel stereo sound. The short distance sound data is created as sound for three or more channels (e.g., 5.1-channel surround sound). A plurality of types of short distance sound data are stored in the parameter storage 160 in accordance with the number of objects located in the vicinity of the viewing position. For example, sound data for a large number of fish swimming and sound data for a small number of fish swimming are prepared separately.

Figure 9:
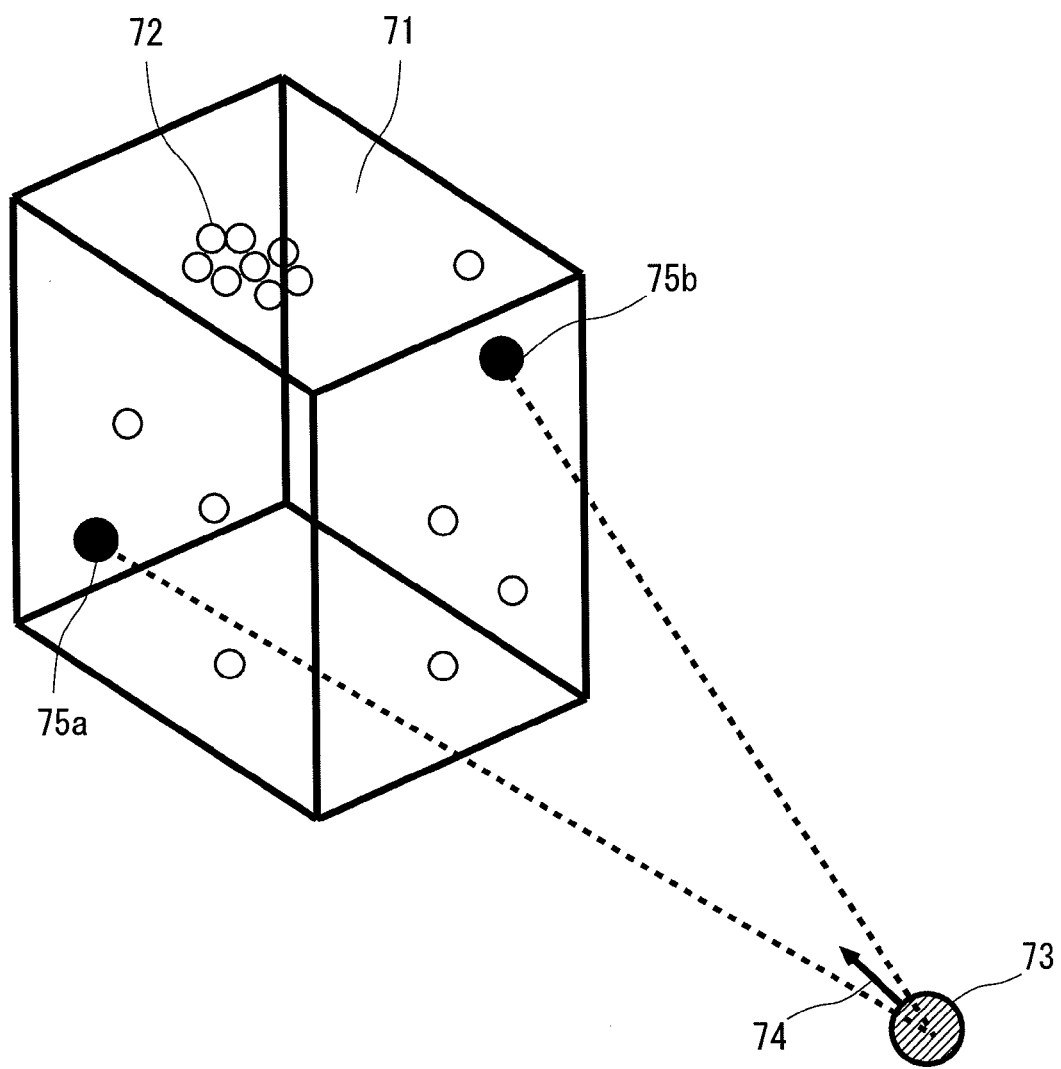
FIG. 9 shows how the sound is produced when the viewing position is at a long distance from the subspace.

FIG. 9 shows how the sound is produced when the viewing position is at a long distance from the subspace. When the distance between a viewing position 173 and a subspace 171 is greater than the first threshold value, the long distance sound production unit 145 uses the long distance sound data to produce sound for the object group located in the subspace 171. Since the long distance sound data is created as 2-channel stereo sound, the long distance sound production unit 145 uses locations 175a and 175b, located symmetrically with respect to the center of the subspace 171, as sound sources and applies the sound data for the right and left channels accordingly.

Figure 10A:
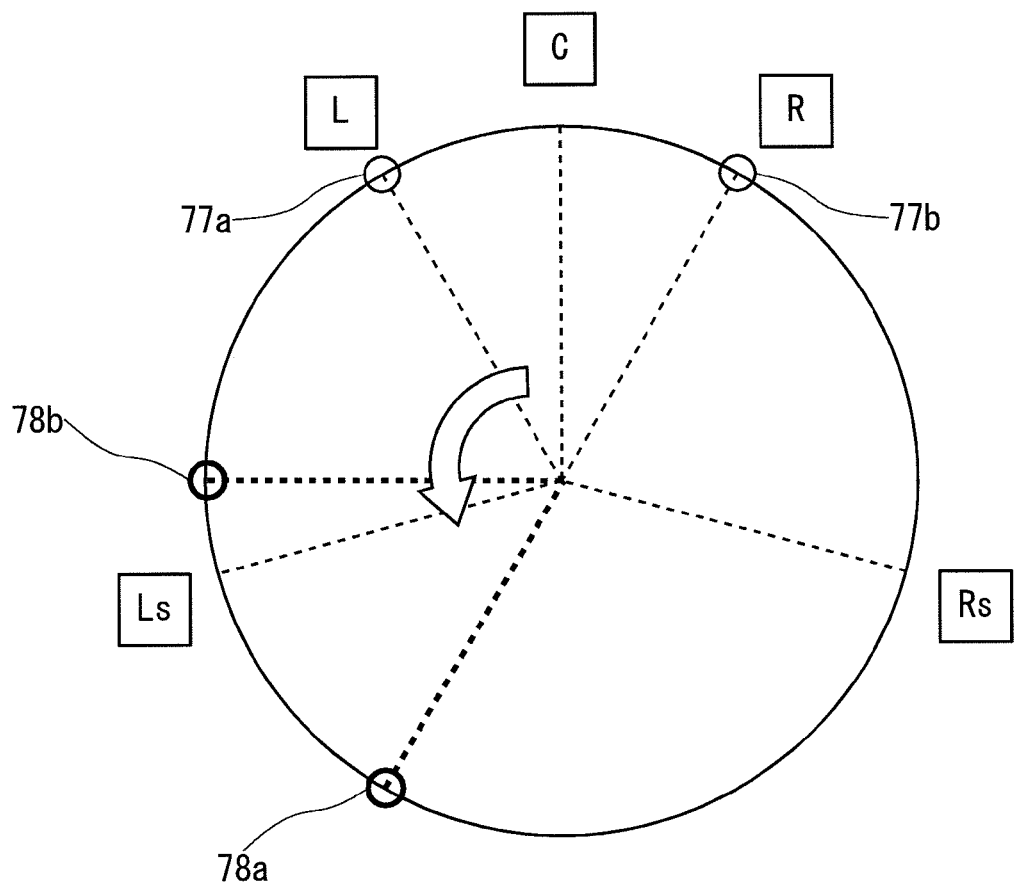
FIGS. 10A and 10B show how the sound is produced when the viewing position is located at a long distance from the subspace.
Figure 10B:
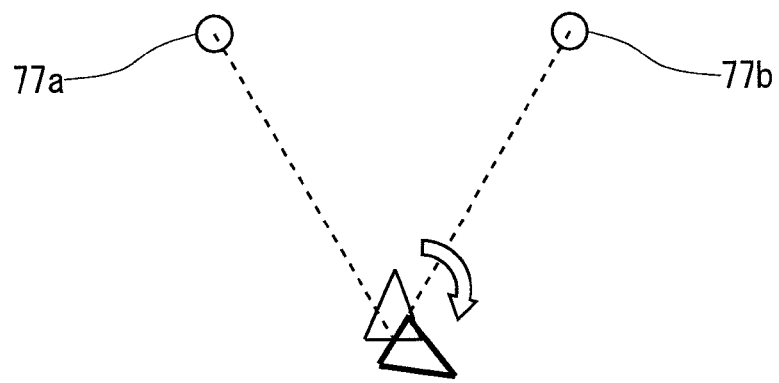

FIGS. 10A and 10B show how the sound is produced when the viewing position is located at a long distance from the subspace. As shown in FIG. 10A, the long distance sound production unit 145 uses a location 177a at left front and a location 177b at right front as sound source locations and accordingly applies the sound data for the right and left channels included in the long distance sound data. When the user rotates the viewing direction clockwise as shown in FIG. 10B, the distance sound production unit 145 rotates the sound source locations counterclockwise by the same angle. In other words, the sound source locations are shifted to locations 178a and 178b. In this way, sound localization is achieved.

Figure 11:
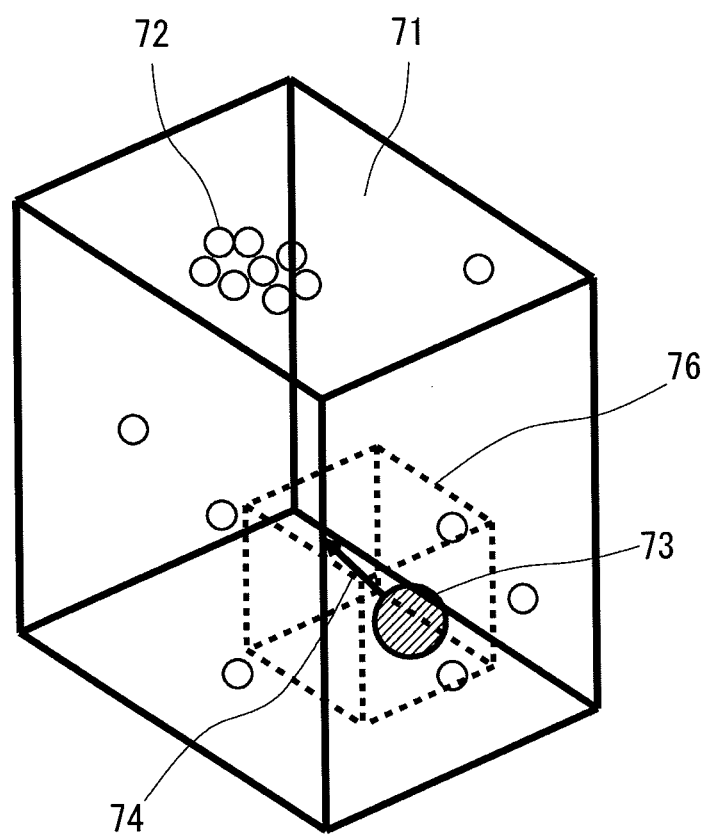
FIG. 11 shows how the sound is produced when the viewing position is at a short distance from the subspace.

FIG. 11 shows how the sound is produced when the viewing position is at a short distance from the subspace. When the distance between the viewing position 173 and the subspace 171 is smaller than the second threshold value, the short distance sound production unit 146 applies the short distance sound data as the sound for the object group located in the subspace 171. A plurality of types of short distance sound data are provided in accordance with the number of objects in the vicinity of the viewing position. The short distance sound production unit 146 determines which sound data is applied as short distance sound data in accordance with the number of objects located in the vicinity of the viewing position. In this embodiment, an object count determination range 176 of a predetermined size is set up in front of the viewing position. The parameter storage 160 is referred to so as to count the number of objects located in the object count determination range 176. The short distance sound production unit 146 examines the short distance sound data so as to determine the applicable sound data in accordance with the number of objects counted. The short distance sound production unit 146 applies the sound data read from the parameter storage 160 in compliance with standards for surround sound such as 5.1-channel sound. In the example shown in FIG. 11, the object count determination range 176 is set up such that the viewing position 173 is behind the gravitational center of the rectangular parallelepiped that defines the object count determination range 176 by a predetermined distance in the viewing direction. In this way, the sound in front of the viewing position is enhanced and output accordingly. The object count determination range 176 may be set up such that the viewing position 173 is at the center or the gravitational center of the object count determination range 176. Alternatively, the range 176 may be set up such that the viewing position 173 is not included.

Figure 12A:
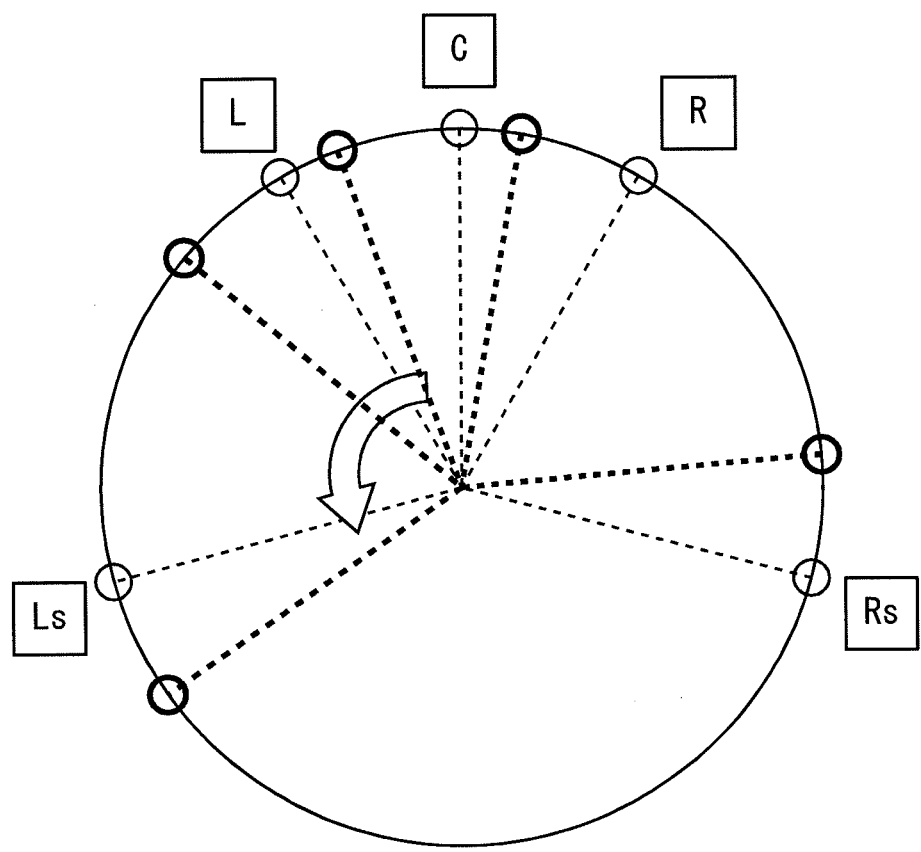
FIGS. 12A and 12B show how the sound is produced when the viewing position is at a short distance from the subspace.
Figure 12B:

FIGS. 12A and 12B show how the sound is produced when the viewing position is at a short distance from the subspace. As shown in FIG. 12A, the short distance sound production unit 146 uses five positions in front, at left front, at right front, at left rear, and at right rear as sound source locations in accordance with the standards, and applies the sound data for five channels included in the short distance sound data accordingly. When the user rotates the viewing direction clockwise as shown in FIG. 12B, the short distance sound production unit 146 rotates the sound source locations counter clockwise by the same angle. In this way, sound localization is achieved. The short distance sound production unit 146 may not only rotate the sound source locations but also set up the object count determination range 176 in the vicinity of the viewing position once again and count the number of objects, thereby determining the applicable sound data according to the number of objects located in the object count determination range 176.

Figure 13:
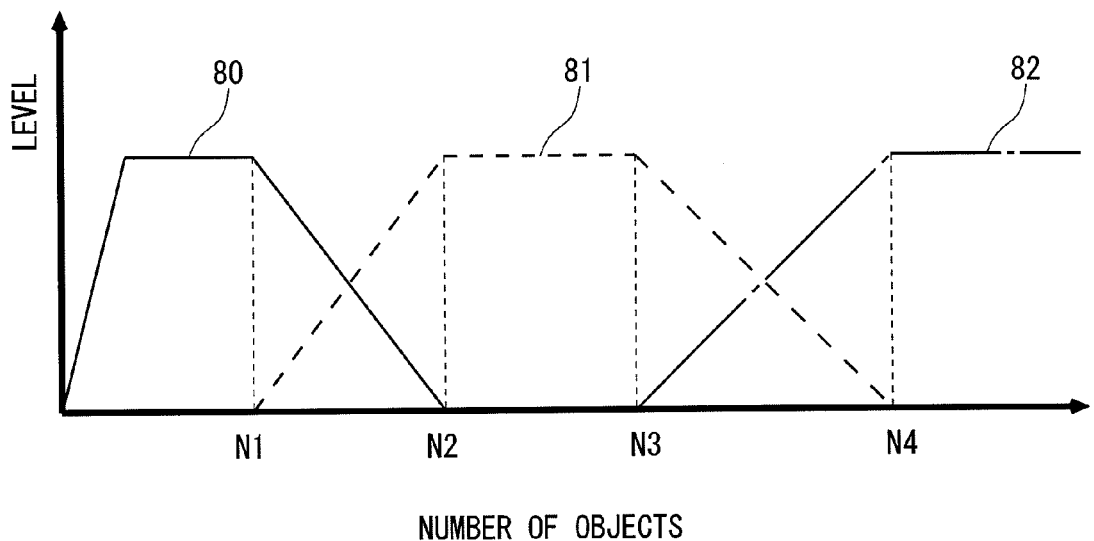
FIG. 13 shows how the short distance sound data applied by the short distance sound production unit is synthesized.

FIG. 13 shows how the short distance sound data applied by the short distance sound production unit 146 is synthesized. The data indicating the synthesis rate shown in FIG. 13 is stored in the parameter storage 160. In the example shown in FIG. 13, three types of sound data 180, 181, and 182 are prepared, depending on the number of objects. When the number of objects is smaller than N1, a synthesizer 147 applies only the sound data 180 at the level indicated in FIG. 13. When the number of objects N is such that N1≤N<N2, the synthesizer 147 synthesizes the sound data 180 and the sound data 181 at the rate indicated in FIG. 13. In a zone where the sound data (e.g., the sound data 181) applicable to a larger number of objects and the sound data (e.g., the sound data 180) applicable to a smaller number of objects are synthesized (in the illustrated case, where the number of objects N is such that N1≤N<N2), it is ensured that the sound data 181 is used in the synthesis at a progressively smaller rate as the number of objects becomes smaller than N2 and that the sound data 180 is used in the synthesis at a progressively greater rate as the number of objects becomes greater than N1. The synthesis rate may be increased or decreased linearly according to the number of objects as shown in FIG. 13. Alternatively, the rate may be changed non-linearly. The synthesis rate may be such that $\alpha:1-\alpha$ $(0 \le \alpha \le 1)$, where $\alpha$ denotes a function of the number of objects N.

Figure 14:
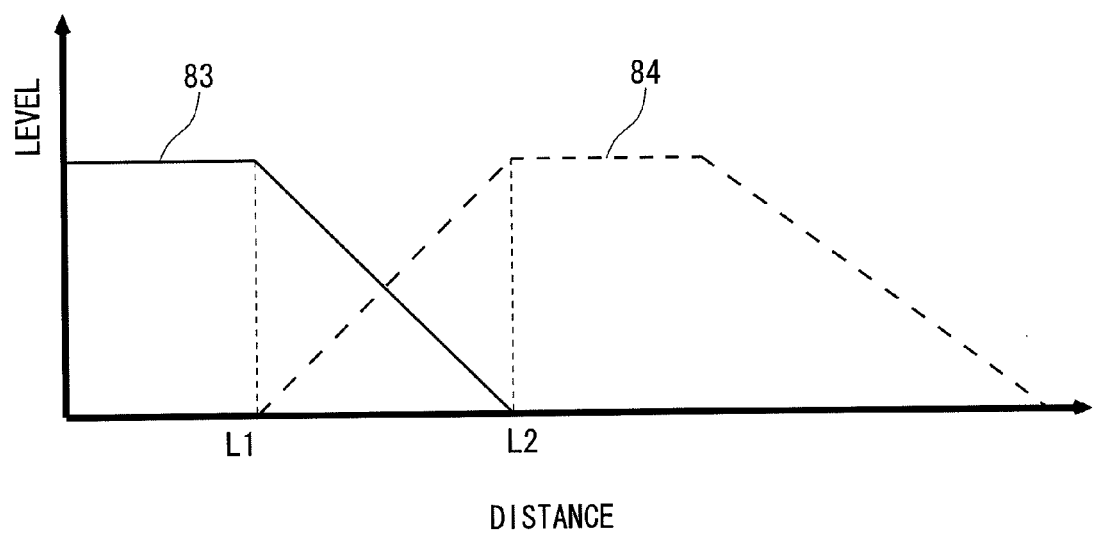
FIG. 14 shows the rate of synthesizing the short distance sound data applied by the short distance synthesizer and synthesized by the synthesizer, and the long distance sound data applied by the long distance sound production unit.

FIG. 14 shows the rate of synthesizing the short distance sound data applied by the short distance synthesis unit 146 and synthesized by the synthesizer 147, and the long distance sound data applied by the long distance sound production unit 145. The data indicating the synthesis rate shown in FIG. 14 is also stored in the parameter storage 160. In the example shown in FIG. 14, the rate of synthesizing short distance sound data 183 and long distance sound data 184 is shown to vary depending on the distance between the viewing position and the subspace. When the distance between the viewing position and the subspace is smaller than L1, the synthesizer 147 applies only the short distance sound data 183 at the level indicated in FIG. 14. When the distance L is such that L1≤L<L2, the synthesizer 147 synthesizes the short distance sound data 183 and the long distance sound data 184 at the rate indicated in FIG. 14. When the distance is equal to or greater than L2, the unit 147 applies only the long distance sound data 184 at the level indicated in FIG. 14. In a zone where the long distance sound data 184 and the short distance sound data 183 are synthesized (in the illustrated case, where the distance L is such that L1≤L<L2), it is ensured that the sound data 184 is used in the synthesis at a progressively smaller rate as the distance becomes smaller than L2 and that the sound data 183 is used in the synthesis at a progressively greater rate as the distance becomes greater than L1. The synthesis rate may be increased or decreased linearly according to the distance as shown in FIG. 14. Alternatively, the rate may be changed non-linearly. The synthesis rate may be such that $\alpha:1\alpha$ $(0 \le \alpha \le 1)$, where $\alpha$ denotes a function of the distance L.

The synthesizer 147 refers to the sound field where a plurality of sets of sound data are synthesized so as to compute the sound that should be output from the speakers 169 in accordance with the number of speakers 169, the positions thereof, etc., before outputting the sound to the speakers 169.

Figure 15:
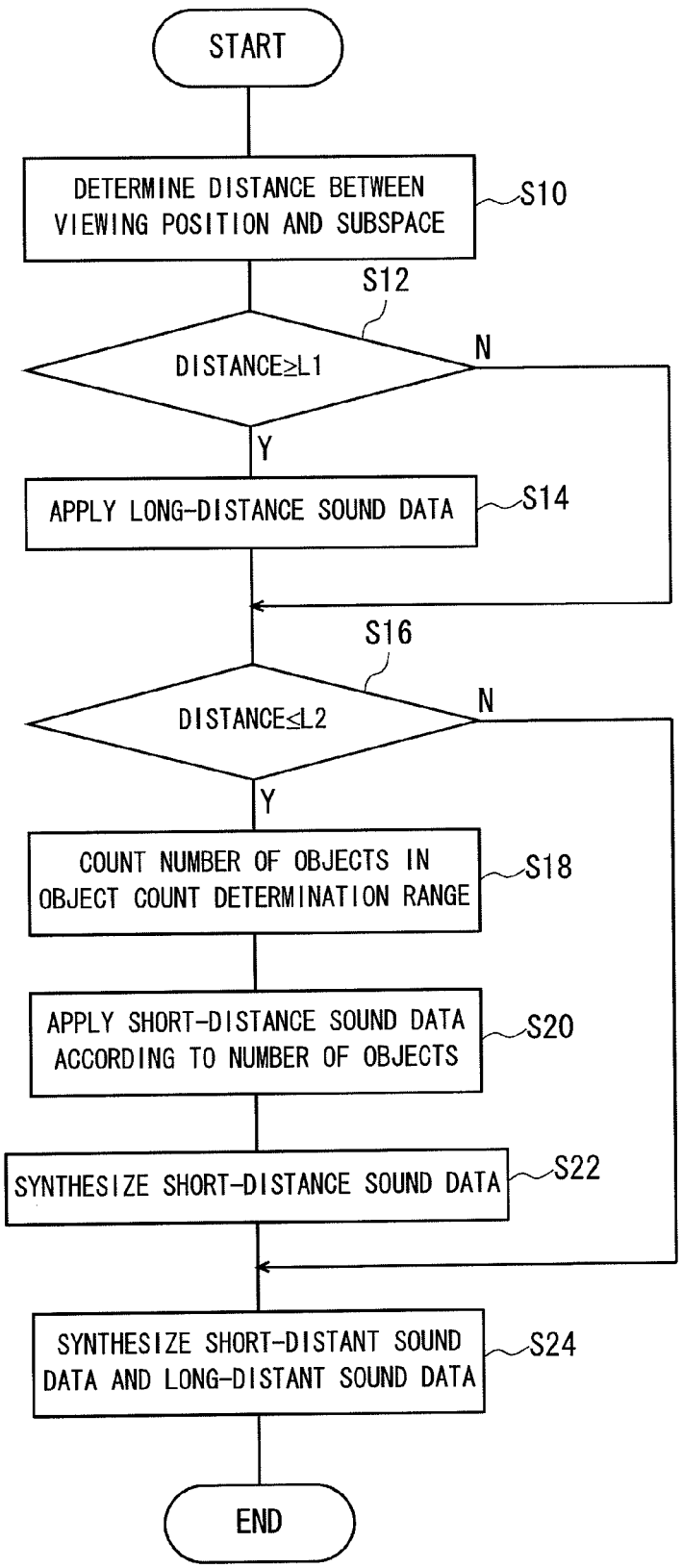
FIG. 15 is a flowchart showing the steps in the game control method according to the embodiment.

FIG. 15 is a flowchart showing the steps in the game control method according to this embodiment. The sound production unit 144 reads the coordinates of the viewing position and the coordinates of the center of the subspace from the parameter storage 160 and computes the distance between the viewing position and the subspace (S110). When the distance is equal to greater than L1 indicated in FIG. 14 (Y in S112), the long distance sound production unit 145 reads the long distance sound 184 from the parameter storage 160 and applies the data thus read (S114). When the distance is smaller than L1 (N in S112), the long distance sound data 184 is not applied so that S114 is skipped.

When the distance is smaller than L2 (Y in S116), the short distance sound production unit 146 refers to the parameter storage 160 so as to compute the number of objects located in the object count determination range 176 (S118) and apply the short distance sound data according to the number of objects (S120). More specifically, when the number of objects N is smaller than N2 indicated in FIG. 13, the sound data 180 is applied. When N1≤N<N4, the sound data 181 is applied. When N is equal to or greater than N3, the sound data 182 is applied. The synthesizer 147 synthesizes the short distance sound data thus applied at the rate indicated in FIG. 13 (S122). When it is determined in S116 that the distance is equal to or greater than L2 (N in S116), the short distance sound data is not applied so that S118-S122 are skipped.

The synthesizer 147 synthesizes the short distance sound data and the long distance sound data at the rate indicated in FIG. 14 (S124). When there are a plurality of subspaces, the above steps are repeated for all subspaces. The synthesizer 147 ultimately synthesizes the sound data synthesized for the subspaces, computes the sound that should be output to the speakers 169 so as to output the sound.

According to the technology of this embodiment, sound data is applied on the object group basis. Therefore, the computational load is reduced even if a large number of objects are located in the virtual three-dimensional space. Since the sound data applied is changed depending on the number of objects located in the vicinity of the viewing position, highly realistic sound is output.

Described above is an explanation based on exemplary embodiments. The embodiments are intended to be illustrative only and it will be obvious to those skilled in the art that various modifications to constituting elements and processes could be developed and that such modifications are also within the scope of the present invention.

What is claimed is:

1. A music production apparatus comprising: a melody data storage operative to store music data for a plurality of melody elements forming music; a condition storage operative to store a condition for combining melody elements stored in the melody data storage and a condition related to an attribute applicable when playing the melody element; an element selector operative to determine, at a predetermined point of time, whether a melody element should be allocated to a track where no melody elements are allocated, and to select, when it is determined that a melody element should be allocated to the track, which is among a plurality of tracks, a melody element that should be allocated to the track by referring to the condition for combining melody elements stored in the condition storage; an attribute determination unit operative to determine an attribute applicable when playing the selected melody element, by referring to the condition storage; and a sound production unit operative to read music data for the selected melody element from the melody data storage, to apply the attribute determined by the attribute determination unit, and to produce a sound signal that should be output to a speaker, using the music data for the melody element allocated to the track.

2. The music production apparatus according to claim 1, further comprising: an environment setting unit operative to read from the melody data storage music data for melody elements of a predetermined data size into a memory and to make the data resident in the memory, prior to the production of music, wherein when the selected melody element is not resident in the memory, the element selector determines whether the sound production unit is capable of reading the music data for the selected melody element from the melody data storage and producing the sound signal accordingly before it is time to play the melody element, and, when it is determined that the sound production is impossible, the selector deselects the selected melody element.

3. The music production apparatus according to claim 2, wherein the melody element selector does not allocate a melody element to a track when the available capacity of the memory falls below a predetermined value or when the load on the sound production unit exceeds a predetermined value.

4. The music production apparatus according to claim 1, wherein the attribute determination unit determines a parameter value defining the attribute at random within a range defined in the condition stored in the condition storage.

5. The music production apparatus according to claim 1, wherein the condition storage further stores, for each of a plurality of blocks forming the music, a condition defining a melody element that can be allocated to a track in the block, and a condition for transition between blocks, the apparatus further comprising a progress controller operative to control the progress of music by referring to the condition for transition between blocks stored in the condition storage.

6. A music production method adapted for playback of music by combining music data for a plurality of melody elements stored in a melody data storage, comprising: determining, at a predetermined point of time, whether a melody element should be allocated to a track where no melody elements are allocated; selecting, when it is determined that a melody element should be allocated to the track, which is among a plurality of tracks, a melody element that should be allocated to the track by referring to a condition for combining melody elements stored in a condition storage, which stores the condition for combining melody elements and a condition related to an attribute applicable when playing the melody element; determining an attribute applicable when playing the selected melody element, by referring to the condition storage; and reading music data for the selected melody element from the melody data storage, applying the attribute determined by the determining, and producing a sound signal that should be output to a speaker, using the music data for the melody element allocated to the track.

7. A program product stored on a non-transitory computer readable medium adapted for playback of music by combining music data for a plurality of melody elements stored in a melody data storage, comprising: a module that determines, at a predetermined point of time, whether a melody element should be allocated to a track where no melody elements are allocated; a module that selects, when it is determined that a melody element should be allocated to the track, which is among a plurality of tracks, a melody element that should be allocated to the track by referring to the condition for combining melody elements stored in the condition storage, which stores the condition for combining melody elements and a condition related to an attribute applicable when playing the melody element; a module that determines an attribute applicable when playing the selected melody element, by referring to the condition storage; and a module that reads music data for the selected melody element from the melody data storage, applies the attribute determined by the module for determining an attribute, and producing a sound signal that should be output to a speaker, using the music data for the melody element allocated to the track.

8. A program product stored on a non-transitory computer readable medium comprising: a module that reads, from a parameter storage storing coordinate data for an object located in a three-dimensional space and a plurality of types of sound data for an object group, the coordinate data or the sound data; a module that changes a viewing position in the three-dimensional space; a module that produces an image of the three-dimensional space as viewed from the viewing position in a predetermined viewing direction; a module that sets up an object count determination range in the vicinity of the viewing position, counts the number of objects located in the object count determination range by referring to the parameter storage, determines, from among the plurality of types of sound data, sound data applicable to the object group, according to the number of objects, reads the sound data thus determined from the parameter storage, and produces sound at the viewing position in the three-dimensional space.

9. The program product according to claim 8, wherein the parameter storage stores, as sound data for an object group located in a subspace set up in the three-dimensional space, a plurality of types of sound data according to a distance between the viewing position and the subspace, the parameter storage also storing, as sound data applicable when the distance is smaller than a first threshold value, an additional plurality of types of sound data according to the number of objects located in the object count determination range, the module for producing sound determines sound data applicable to an object group such that the module first determines applicable sound data according to a distance between the viewing position and the subspace the object group belongs to, and, when applying the sound data applicable when the distance is smaller than the first threshold value, the module further determines applicable sound data according to the number of objects located in the object count determination range.

10. The program product according to claim 9, wherein the parameter storage stores, according to the number of objects located in the object count determination range, a first rate of synthesizing a plurality of sets of sound data applicable when the distance between the viewing position and the subspace is smaller than the first threshold value, and also stores, according to the distance between the viewing position and the subspace, a second rate of synthesizing sound data applicable when the distance is smaller than a second threshold value and sound data applicable when the distance is equal to or greater than the second threshold value, the program product further comprising a module that synthesizes a plurality of sets of sound data applicable when the distance is smaller than the first threshold value in the first rate stored in the parameter storage, according to the number of objects located in the object count determination range, and that synthesizes the sound data applicable when the distance is smaller than the second threshold value and the sound data applicable when the distance is equal to or greater than the second threshold value in the second rate stored in the parameter storage, according to the distance between the viewing position and the subspace.

11. A game device comprising: a parameter storage operative to store coordinate data for an object located in a three-dimensional space and a plurality of types of sound data for an object group; a movement controller operative to change a viewing position in the three-dimensional space; an image production unit operative to produce an image of the three-dimensional space as viewed from the viewing position in a predetermined viewing direction; and a sound production unit operative to set up an object count determination range in the vicinity of the viewing position, count the number of objects located in the object count determination range by referring to the parameter storage, determine, from among the plurality of types of sound data, sound data applicable to the object group, according to the number of objects, read the sound data thus determined from the parameter storage, and produce sound at the viewing position in the three-dimensional space.

12. A game control method comprising: reading, from a parameter storage storing coordinate data for an object located in a three-dimensional space and a plurality of types of sound data for an object group, the coordinate data or the sound data; changing a viewing position in the three-dimensional space; producing an image of the three-dimensional space as viewed from the viewing position in a predetermined viewing direction; setting up an object count determination range in the vicinity of the viewing position, counting the number of objects located in the object count determination range by referring to the parameter storage, determining, from among the plurality of types of sound data, sound data applicable to the object group, according to the number of objects, reading the sound data thus determined from the parameter storage, and producing sound at the viewing position in the three-dimensional space.

* * * * *